Patented Oct. 5, 1954

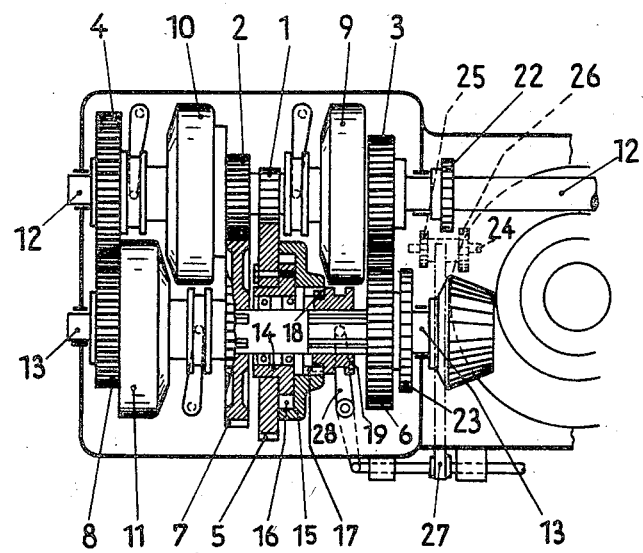

2,690,680

UNITED STATES PATENT OFFICE 2,690,680

MULTIRATIO CHANGE SPEED GEAR

Albert Maier and Julius Kiechle, Friedrichshafen, Germany, assignors to Zahnradfabrik Friedrichshafen, Aktiengesellschaft, Friedrichshafen, Germany Application September 5, 1951, Serial No. 245,190

Claims priority, application Germany September 8, 1950

5 Claims. (Cl. 74—368)

Our invention relates to multi-ratio change speed gears, especially for power-driven vehicles, said gears having constantly meshing wheels or pinions and engageable and disengageable clutches associated therewith, together with a torque-transmitting free-wheel device in the lowest gear train.

It is already known to provide a free-wheel device (ratchet brake) on the shaft in the rear of the gear box, and serving as a sprag when going uphill, for which purpose however it is necessary to provide a special built-in device enabling the free-wheel arrangement to be thrown out of action when wishing to reverse. It is also known to install free wheel devices for the purpose of facilitating gear changing, in which case said free-wheel devices must be thrown out of action again in each case with every disengagement of a gear train.

In contradistinction to the known arrangements the present invention provides a further development of the gear box inasmuch as the arrangement now consists in that as each further gear train is thrown into engagement, the free-wheel device of the pinions of the lowest gear train need not be disengaged, so that if the vehicle stalls when going uphill and tends to run backwards, an automatic braking effect is produced between each gear change, whereas when travelling forwards on the other hand the free-wheel can be over-run. Starting up again is therefore quite a simple matter. The free-wheel device is thus of great value from a two-fold aspect, in that a sprag effect is achieved by simple means and moreover a general simplification of gear changing is produced.

According to a feature of the invention the free-wheel device is provided on the pinion on the driven shaft of the pair of wheels responsible for the lowest gear train. At the same time there is provided on the driven shaft the gear shift sleeve for the lowest train. Advantageously, a simple dog clutch is employed, which may engage in an annular portion of the free-wheel device. A further advantage of the construtcion according to the invention consists in that a particularly axially compact design of gear box is possible.

The accompanying drawing shows an example of a change speed gear according to the invention with four forward positions and one reverse position.

The gear box is shown in longitudinal section. The driving shaft 12 to be connected to the vehicle engine carries in this case the driving members of the four pairs of gear-wheels. The latter are arranged, looking from the engine end, in serial order for the third, first, second and fourth gear changes. The complementary members of the gear wheel assembly are all mounted on the driven shaft 13. Wheels 3 and 6 are engaged for the third change, 1 and 5 for the first, 2 and 7 for the second and 4 and 8 for the fourth. Shift couplings 9, 10 and 11 are provided for the pairs of gear wheels for the third, second and fourth changes, these being friction clutches, 9 and 10 being mounted on the driving shaft 12, whereas clutch 11 is mounted on the driven shaft 13. The clutch connection for the pair of wheels 1, 5 for the first gear change is advantageously a simple dog clutch, this being connected with the wheel 5 mounted on the driven shaft 13 with the interposition of a free wheel device. The latter consists of the inner ring 14 secured to the wheel 5, the outer ring 15 and the interposed clamp bodies 16. The outer ring 15 is provided with a dog crown 17, with which the gear shift sleeve 19 can be brought into engagement by means of dogs 18.

For the purpose of reversing, the toothed pinion 22 is mounted on the shaft 12 and the toothed pinion 23 on the shaft 13. The drive between these two wheels is established through wheels 25 and 26 mounted on the reverse idler gear shaft 24. It is advantageous for the actuating member 27 for shifting the return shaft 24 to be coupled with the shift lever 28 of the gear shift sleeve 19, in order that when shifting into reverse the gear shift collar 19 is simultaneously moved out of engagement with the outer ring 15 of the free wheel device and thus blocking by the free wheel is prevented.

What we claim is:

1. In a multi-ratio change speed gear, especially for power driven vehicles: a driving shaft, a driven shaft arranged parallel to the driving shaft, a plurality of pairs of toothed wheels mounted on the driving and the driven shaft, respectively, and being in constant mesh, engageable and disengageable clutches associated with the pairs of wheels, the one of the wheels of the pair for the lowest gear train is provided with a torque-transmitting free-wheel device the one part of which is fixed to said wheel and the other part forming a coupling half, a gear shift sleeve splined on the shaft on which the wheel is mounted, and engaged with the coupling half of the free-wheel device, means whereby said gear shift sleeve may be thrown into engagement and out of engagement, reversing gears, and means for operating said reversing gears connected to the first said means to disengage the gear shift sleeve upon reversing the gears.

2. In a multi-ratio change speed gear, especially for power driven vehicles: a driving shaft, a driven shaft arranged parallel to the driving shaft, a plurality of pairs of toothed wheels mounted on the driving and the driven shaft, respectively, and being in constant mesh, engageable and disengageable clutches associated with the pairs of wheels, the one of the wheels of the pair for the lowest gear train is provided with a torque-transmitting free wheel device, the one part of which is fixed to that wheel and the other part is provided with a dog crown, a gear shift sleeve splined on the shaft on which the wheel is mounted, and engaged with the said dog crown, means whereby said gear shift sleeve may be thrown into engagement and out of engagement, reversing gears, means to engage said reversing gears in driving relation to the gear train, the last said means being connected to the first means to disengage the gear shift sleeve upon engagement of the reversing gears.

3. In a multi-ratio change speed gear, especially for power driven vehicles: a driving shaft, a driven shaft arranged parallel to the driving shaft, a plurality of pairs of toothed wheels mounted on the driving shaft and the driven shaft, respectively, and being in constant mesh, engageable and disengageable clutches associated with the pairs of wheels, the one of the wheels of the pair for the lowest gear train, which wheel belongs to the driven shaft, is provided with a torque-transmitting free-wheel device, the one part of which is fixed to that wheel and the other part is provided with a dog crown, a gear shift sleeve splined on the driven shaft and engaged with the said dog crown, means whereby said gear shift sleeve may be thrown into engagement and out of engagement, reversing gears, and means for operating said reversing gears connected to the first said means to disengage the gear shift sleeve upon reversing the gears.

4. In a multi-ratio change speed gear, especially for power driven vehicles: a driving shaft, a driven shaft arranged parallel to the driving shaft, a plurality of pairs of toothed wheels mounted on the driving and the driven shaft, respectively, and being in constant mesh, engageable and disengageable clutches associated with the pairs of wheels, the one of the wheels of the pair for the lowest gear train is provided with a torque-transmitting free wheel device, the one part of which is fixed to that wheel, and the other part is provided with a dog crown, a gear shift sleeve splined on the shaft on which the wheel is mounted, and engaged with the said dog crown, means whereby said gear shift sleeve may be thrown into engagement and out of engagement, reversing gears and means for operating the reversing gears, the first said means being coupled to the means for operating the reversing gears to disengage the gear shift sleeve upon reversing the gears, so that blocking of the free-wheel device is prevented when shifting into reverse.

5. In a gear box, a driving shaft, a driven shaft arranged parallel to the driving shaft, a pair of tooth wheels mounted one on the driving shaft and one on the driven shaft, said wheels being in constant mesh, the one of the wheels being provided with a torque-transmitting free-wheel device, the one part of which is fixed to said one wheel and the other part forming a coupling half, a gear shift sleeve splined on the shaft on which the wheel is mounted and engaged with the coupling half of the free-wheel device, means whereby said gear shift sleeve may be thrown into engagement and out of engagement, reversing gears, and means for operating the reversing gears connected to said means to disengage the gear shift sleeve upon engaging the reversing gears.

References Cited in the file of this patent

UNITED STATES PATENTS

| Number | Name | Date |
|---|---|---|
| 1,724,202 | Jacobs | Aug. 13, 1929 |
| 1,980,505 | Snow | Nov. 13, 1934 |
| 2,427,652 | Banker | Sept. 23, 1947 |
| 2,461,027 | Bodmer | Feb. 8, 1949 |